(12) United States Patent
Calaway et al.

(10) Patent No.: US 7,876,522 B1
(45) Date of Patent: Jan. 25, 2011

(54) DISK DRIVE UPDATING ESTIMATE OF VOICE COIL RESISTANCE TO ACCOUNT FOR RESISTANCE CHANGE PRIOR TO UNLOAD OPERATION

(75) Inventors: Charles J. Calaway, Santa Ana, CA (US); Ashok K. Desai, Westlake Village, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 303 days.

(21) Appl. No.: 12/241,814

(22) Filed: Sep. 30, 2008

(51) Int. Cl.
*G11B 5/54* (2006.01)
*G11B 21/12* (2006.01)

(52) U.S. Cl. ...................... 360/75; 360/78.04
(58) Field of Classification Search .................. None
See application file for complete search history.

(56) References Cited

U.S. PATENT DOCUMENTS

| | | | |
|---|---|---|---|
| 5,455,723 A | 10/1995 | Boutaghou et al. | |
| 5,594,603 A | 1/1997 | Mori et al. | |
| 5,768,045 A | 6/1998 | Patton, III et al. | |
| 5,831,786 A | 11/1998 | Boutaghou et al. | |
| 5,936,788 A | 8/1999 | Boutaghou et al. | |
| 5,982,130 A | 11/1999 | Male | |
| 6,025,968 A | 2/2000 | Albrecht | |
| 6,148,240 A | 11/2000 | Wang et al. | |
| 6,396,652 B1 | 5/2002 | Kawachi et al. | |
| 6,512,650 B1 | 1/2003 | Tanner | |
| 6,563,660 B1 | 5/2003 | Hirano et al. | |
| 6,690,536 B1 | 2/2004 | Ryan | |
| 6,731,450 B1 | 5/2004 | Codilian et al. | |
| 6,795,268 B1 | 9/2004 | Ryan | |
| 6,917,486 B2 | 7/2005 | Tanner | |
| 6,950,272 B1 | 9/2005 | Rice et al. | |
| 7,009,806 B2 * | 3/2006 | Zayas et al. | 360/78.04 |
| 7,042,673 B2 * | 5/2006 | Jeong | 360/75 |
| 7,072,135 B2 | 7/2006 | Suzuki | |
| 7,082,009 B2 | 7/2006 | Zayas et al. | |
| 7,110,207 B2 | 9/2006 | Hirano et al. | |
| 7,193,804 B1 | 3/2007 | Kheymehdooz | |
| 7,196,863 B2 | 3/2007 | Sakamoto | |
| 7,224,546 B1 | 5/2007 | Orakcilar et al. | |
| 7,243,058 B1 | 7/2007 | Du et al. | |
| 7,340,968 B2 | 3/2008 | Schneider et al. | |
| 7,421,359 B2 * | 9/2008 | Harmer et al. | 702/85 |
| 7,477,471 B1 * | 1/2009 | Nemshick et al. | 360/75 |
| 7,728,539 B2 | 6/2010 | Smith et al. | 318/400.34 |
| 7,787,211 B2 * | 8/2010 | Kim et al. | 360/78.06 |
| 2001/0019463 A1 | 9/2001 | Drouin | |
| 2003/0161065 A1 | 8/2003 | Yatsu | |

* cited by examiner

*Primary Examiner*—Hoa T Nguyen
*Assistant Examiner*—James L Habermehl

(57) ABSTRACT

A disk drive is disclosed comprising a disk and a head actuated over the disk by a voice coil motor (VCM) comprising a voice coil, wherein the VCM is controlled by a VCM control loop comprising an IR voltage detector. The IR voltage detector is updated by measuring a first back EMF voltage of the voice coil, and after measuring the first back EMF voltage, applying a first control current to the voice coil for a first interval and applying a second control current to the voice coil for a second interval. After the second interval, a second back EMF voltage is measured, and a delta voltage is computed relative to a difference between the first back EMF voltage and the second back EMF voltage. The IR voltage detector is adjusted in response to the delta voltage and at least one of the first and second control currents.

24 Claims, 9 Drawing Sheets

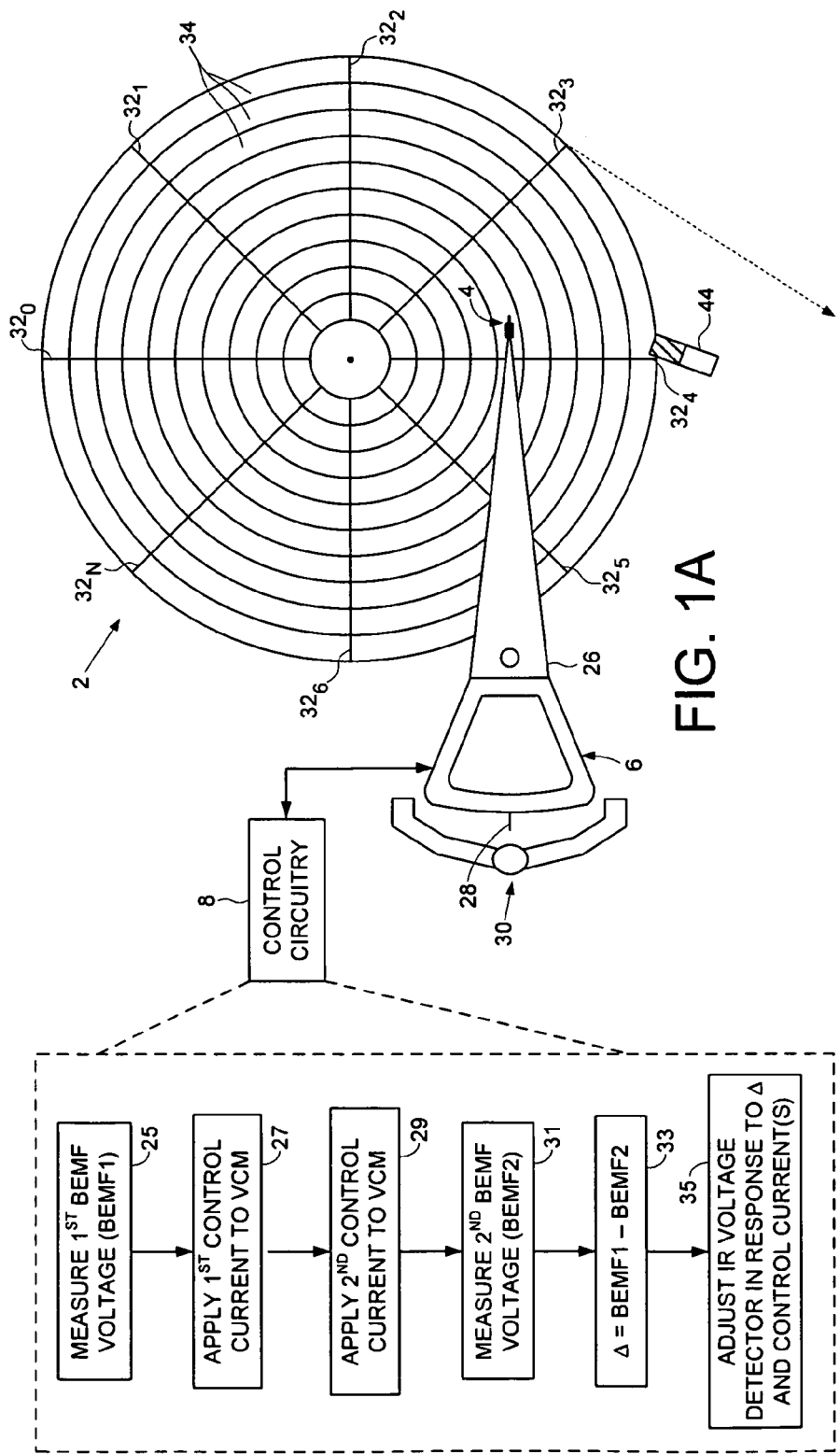
FIG. 1A
FIG. 1B
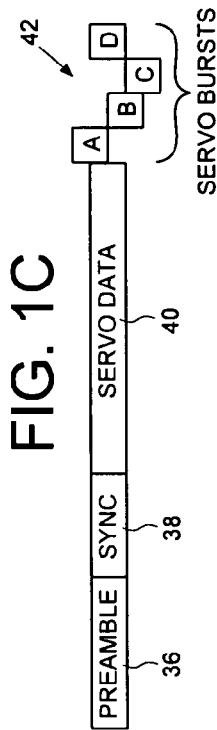
FIG. 1C

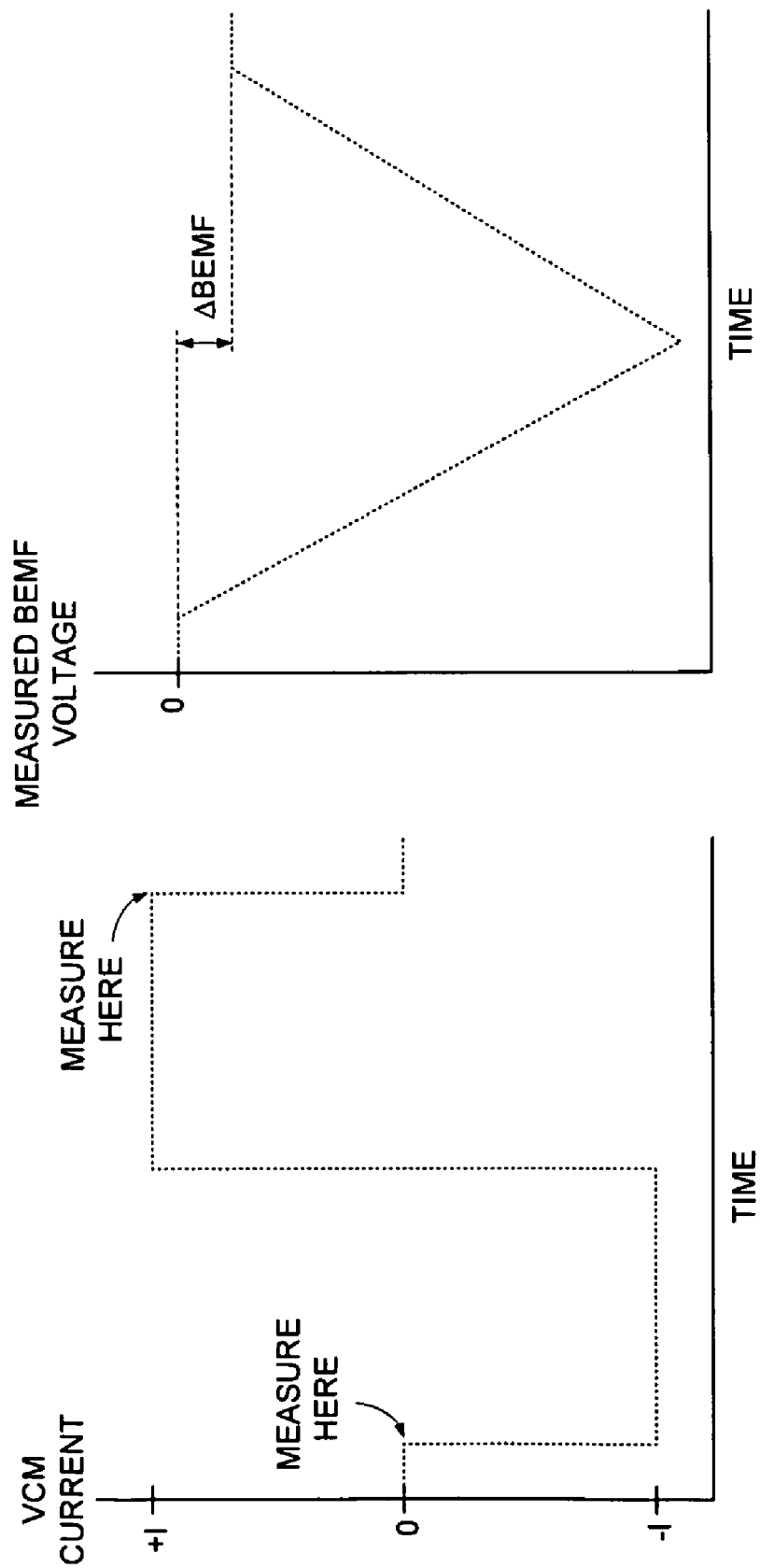

DISK DRIVE UPDATING ESTIMATE OF VOICE COIL RESISTANCE TO ACCOUNT FOR RESISTANCE CHANGE PRIOR TO UNLOAD OPERATION

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

There are times when the servo control system does not have access to the embedded servo sectors yet it is still desirable to control the velocity of the actuator arm. For example, in disk drives employing ramp loading/unloading, it is desirable to control the velocity of the actuator arm so that the head is not damaged as it travels off the ramp onto the disk as well as off the disk onto the ramp. Another example is if the servo control system loses servo sector synchronization it is desirable to control the velocity of the actuator arm to facilitate re-synchronizing to the servo sectors.

Prior art techniques for controlling the velocity of the actuator arm when servo sector information is unavailable include using a velocity control loop with the detected back EMF voltage generated by the VCM as the feedback. The voltage across the voice coil (the voice coil voltage) comprises a component due to the inductance L of the VCM, a component due to the resistance R of the VCM, and a component due to the velocity of the VCM referred to as the back EMF voltage. If the component due to the resistance R is canceled from the voice coil voltage, at low frequencies Ldi/dt is small leaving the back EMF voltage due to the velocity of the VCM as the dominant component.

The resistance of the VCM may vary over time due to fluctuations in temperature of the voice coil, which typically depends on the recent seek activity of the VCM. For example, if the resistance is estimated prior to a load operation using a suitable calibration technique, the resistance may change over time such that the initial estimate is no longer reliable during an unload operation. The error in the estimated resistance may have undesirable effects, such as damaging the head due to an excessive unload velocity, or failure of the unload operation due to insufficient unload velocity.

BRIEF DESCRIPTION OF THE DRAWINGS

FIG. 1A shows a disk drive according to an embodiment of the present invention comprising a disk, a head actuated over the disk by a voice coil motor (VCM), and control circuitry for calibrating a VCM control loop.

FIG. 1B is a flow diagram according to an embodiment executed by the control circuitry for updating an IR voltage detector of the VCM control loop.

FIG. 1C shows a format of a servo sector according to an embodiment of the present invention.

FIGS. 4A and 4B illustrate an embodiment of the present invention wherein the voice coil is pulsed with a negative and then positive current, and the resulting delta in the measured back EMF voltage used to update the IR voltage detector.

DETAILED DESCRIPTION OF EMBODIMENTS OF THE INVENTION

Figure 2:
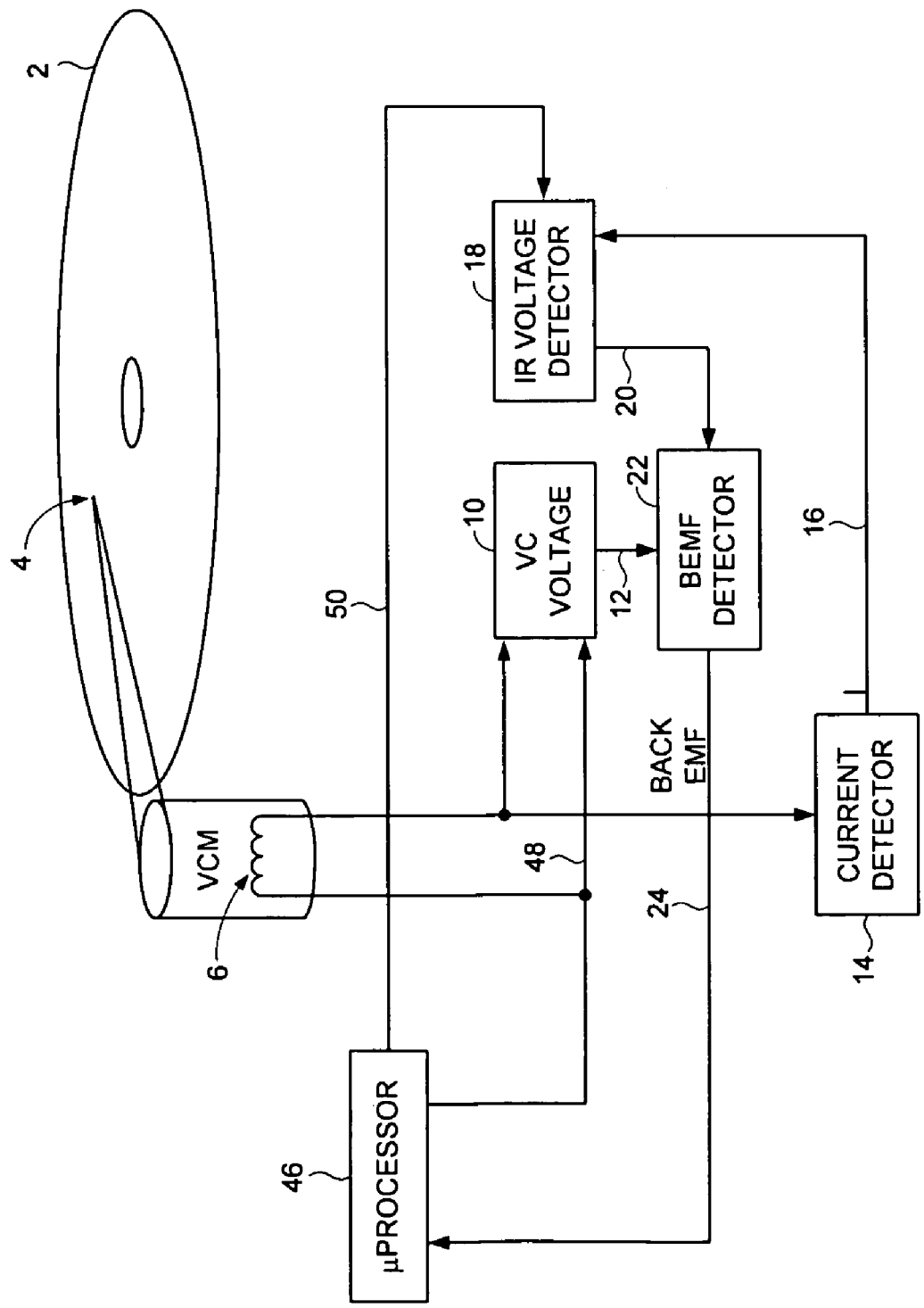
FIG. 2 shows control circuitry including a microprocessor for updating an IR voltage detector of a VCM control loop according to an embodiment of the present invention.

FIG. 1A shows a disk drive according to an embodiment of the present invention comprising a disk 2, a head 4, and a voice coil motor (VCM) comprising a voice coil 6 operable to actuate the head 4 radially over the disk 2. The disk drive comprises control circuitry 8 including a VCM control loop (FIG. 2) comprising a voltage detector 10 operable to detect a voice coil voltage 12 across the voice coil 6. A current detector 14 detects a current 16 flowing through the voice coil 6, and an IR voltage detector 18, responsive to the detected current 16, operable to detect a resistive voltage 20 due to a resistance of the voice coil 6. A back EMF detector 22 subtracts the resistive voltage 20 from the voice coil voltage 12 to generate a back EMF voltage 24.

The control circuitry 8 executes the flow diagram of FIG. 1B to update the IR voltage detector 18. A first back EMF voltage is measured (step 25), and after measuring the first back EMF voltage, a first control current is applied to the voice coil for a first interval (step 27) and a second control current is applied to the voice coil for a second interval (step 29). After the second interval, a second back EMF voltage is measured (step 31). A first delta voltage is computed relative to a difference between the first back EMF voltage and the second back EMF voltage (step 33), and the IR voltage detector 18 is adjusted in response to the first delta voltage and at least one of the first and second control currents (step 35).

In the embodiment of FIG. 1A, the head 4 is connected to a distal end of an actuator arm 26 which is rotated about a pivot by the VCM to actuate the head 4 radially over the disk 2. The VCM comprises at least one permanent magnet (not shown) that generates a magnetic field which interacts with the magnetic field of the voice coil 6 (when energized with current) to thereby generate a rotational torque. A tang 28 coupled to a base of the actuator arm 26 interacts with a crash stop 30 in order to limit the stroke of the actuator arm 26.

In the embodiment of FIG. 1A, the disk 2 comprises a plurality of embedded servo sectors $32_0$-$32_N$ that define a plurality of data tracks 34. FIG. 1C shows an example format of a servo sector 32, comprising a preamble 36 for storing a periodic pattern that enables proper gain adjustment and timing synchronization of the read signal, and a sync mark 38 for storing a special pattern used to symbol synchronize to a servo data field 40. The servo data field 40 stores coarse head positioning information, such as a track address, used to position the head over a target data track during a seek operation. Each servo sector 32, further comprises groups of servo bursts 42 (e.g., A, B, C and D bursts), which comprise a number of consecutive transitions recorded at precise intervals and offsets with respect to a data track centerline. The groups of servo bursts 42 provide fine head position information used for centerline tracking while accessing a data track during write/read operations.

In the embodiment of FIG. 1A, the disk drive further comprises a ramp 44 mounted near an outer edge of the disk 2. While the disk drive is powered down or idle, the actuator arm 26 is unloaded onto the ramp 44 in order to park the head 4. When the disk drive is powered on or exiting the idle mode, the actuator arm 26 is rotated so as to load the actuator arm 26 and position the head 4 over the surface of the disk 2. When loading and unloading the actuator arm 26, the VCM is controlled in response to the back EMF voltage generated across the voice coil 6 since the servo sectors $32_0$-$32_N$ are inaccessible. However, if the components of the servo loop are not estimated correctly (e.g., the resistance of the voice coil 6), it may cause the VCM control loop to damage the head by unloading too fast, or cause the unload operation to fail altogether.

Figure 3:
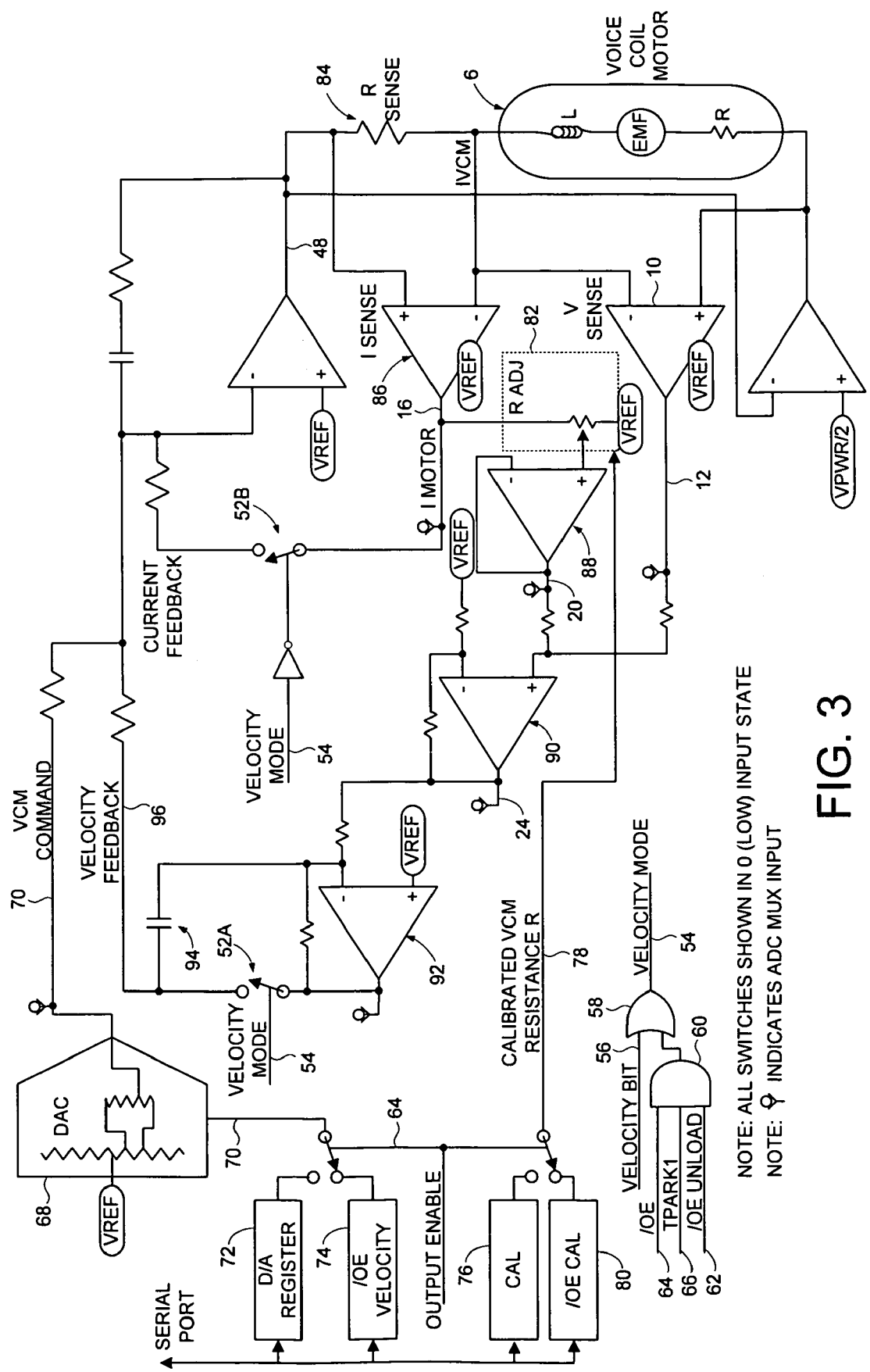
FIG. 3 shows circuitry according to an embodiment of the present invention for implementing a VCM control loop.

Referring again to the embodiment of FIG. 2, the control circuitry 8 comprises a microprocessor 46 which generates the control currents 48 applied to the voice coil 6 in order to update (over line 50) the IR voltage detector 18 by executing the flow diagram of FIG. 1B. The remaining control circuitry of FIG. 2 may be implemented using any suitable circuitry, wherein example circuitry is illustrated in FIG. 3. The circuit of FIG. 3 operates in a normal operating mode wherein the VCM is driven by a current controlled feedback loop, and in a velocity control mode wherein the VCM is driven by a voltage controlled feedback loop. When in the normal operating mode (and when updating the IR voltage detector 18), switch 52A is opened and switched 52B is closed to configure the current feedback loop, and when in the velocity control mode, switch 52A is closed and switch 52B is opened to configure the voltage feedback loop. A velocity mode control signal 54 configures the switches 52A and 52B for velocity control mode when the embedded servo information is not available for servo controlling the VCM. A velocity bit 56 is set to activate the velocity mode control signal 54 via OR gate 58. The velocity bit 56 may be set during controlled modes of operation, such as during a load/unload operation or when synchronization to the embedded servo data is lost. The velocity mode control signal 56 may also be activated via AND gate 60 and OR gate 58 during power down or power failure. If the OE UNLOAD signal 62 has been preset to configure the drive for velocity mode unload, when a power down or power failure is detected, the control signals OUTPUT ENABLE (OE) 64 and TPARK1 66 are automatically activated, thereby activating the velocity mode control signal 54.

A digital-to-analog converter (DAC) 68 generates an analog VCM command signal 70 in response to a digital command input signal 70. A digital register 72 is programmed with an operating command input during normal operation, and a digital register 74 is programmed with a velocity mode command input used during power down or power failure to park the head 4. A digital register 76 stores a calibrated VCM resistance R value 78 for use during velocity control mode when the velocity bit 56 is activated (e.g., when calibrating the detected IR voltage 20). After calibrating the detected IR voltage 20, a digital register 80 stores the calibrated VCM resistance R value 78 for use during power down or power failure. The calibrated VCM resistance R value 78 is used to program a variable resistor 82 in order to calibrate the detected IR voltage 20. For more information on calibrating the IR voltage 20, see U.S. Pat. No. 6,690,536 "DISK DRIVE EMPLOYING VCM DEMAND CURRENT TO CALIBRATE VCM IR VOLTAGE FOR VELOCITY CONTROL OF AN ACTUATOR ARM" and U.S. Pat. No. 6,795,268 "DISK DRIVE EMPLOYING SEEK TIME VCM IR VOLTAGE CALIBRATION FOR VELOCITY CONTROL OF AN ACTUATOR ARM" the disclosures of which are incorporated herein by reference.

A sense resistor 84 and amplifier 86 implement a suitable current detector 14 for generating a voltage representing the current 16 flowing through the voice coil 6. With the voltage representing the current 16 applied to the variable resistor 82, the output of amplifier 88 is the calibrated IR voltage 20. An amplifier 10 measures the voltage 12 across the voice coil 6. The IR voltage 20 is subtracted from the voice coil voltage 12 and amplified at amplifier 90 such that the output voltage of amplifier 90 is the detected back EMF voltage 24. The detected back EMF voltage 24 is filtered by amplifier 92 and capacitor 94 to generate a velocity feed back voltage 96 representative of the velocity of the VCM 6. The velocity feedback voltage 96 is subtracted from the VCM command signal 70 to generate the control current 48 applied to the voice coil 6.

The control circuitry of FIG. 3 comprises a number of output ports which are multiplexed into the input of an analog-to-digital converter (ADC). This enables sampling of one or more of the signals. In an alternative embodiment to FIG. 3, the detected back EMF voltage 24 may be converted into a digital signal (e.g., using an ADC), and the digital signal compared to the VCM command signal by a microprocessor to generate the control current 48. In this embodiment, the control circuitry of FIG. 3 operates as a current controlled loop when controlling the VCM in the velocity control mode (e.g., during load/unload).

FIGS. 4A and 4B illustrate an embodiment of the present invention wherein the control circuitry 8 updates the IR voltage detector 18 by applying a negative current to the voice coil for a first interval, and then applying a positive current to the voice coil for a second interval. A first back EMF voltage is measured just prior to applying the negative current, and a second back EMF voltage is measured at the end of the second interval. With the amplitudes of the negative and positive currents being equal, and the first and second intervals being equal, the first and second back EMF voltages will be equal if the IR voltage detector 18 is calibrated correctly (ignoring external disturbances such as the flex bias). Therefore, the difference between the first and second back EMF voltages ($\Delta$BEMF) represents the error in the calibrated resistance of the voice coil. In one embodiment, the IR voltage detector 18 is updated by adding a corresponding offset to the estimated voice coil resistance (e.g., by adjusting the programmable resistor 82 of FIG. 3). Alternatively, the gain of amplifier 88 in FIG. 3 may be adjusted with a suitable offset. In one embodiment, the offset is computed as:

$$\text{offset} = (\Delta\text{BEMF}) \cdot \alpha / I$$

where l is the amplitude of the control current applied to the voice coil, and α is a suitable scalar that accounts for various factors such as the gain of the ADC circuitry used to measure the back EMF voltages.

Computing the above offset in response to the control current provides a relatively accurate and immediate adjustment to the IR voltage detector 18 which accounts for changes in operating parameters, such as changes in ambient temperature. Accordingly, just prior to executing an unload operation, the above offset can be generated quickly in order to update the IR voltage detector 18 without having to wait for the estimated voice coil resistance to converge to an accurate value.

Figure 5A:
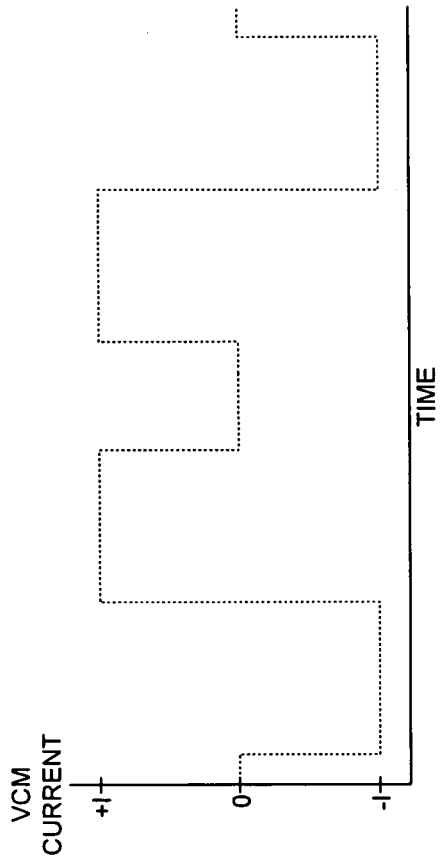
FIGS. 5A and 5B illustrate an embodiment of the present invention wherein the voice coil is pulsed in a first direction and then in an opposite direction to measure a first delta voltage and a second delta voltage, and the average of the difference used to update the IR voltage detector.
Figure 5B:
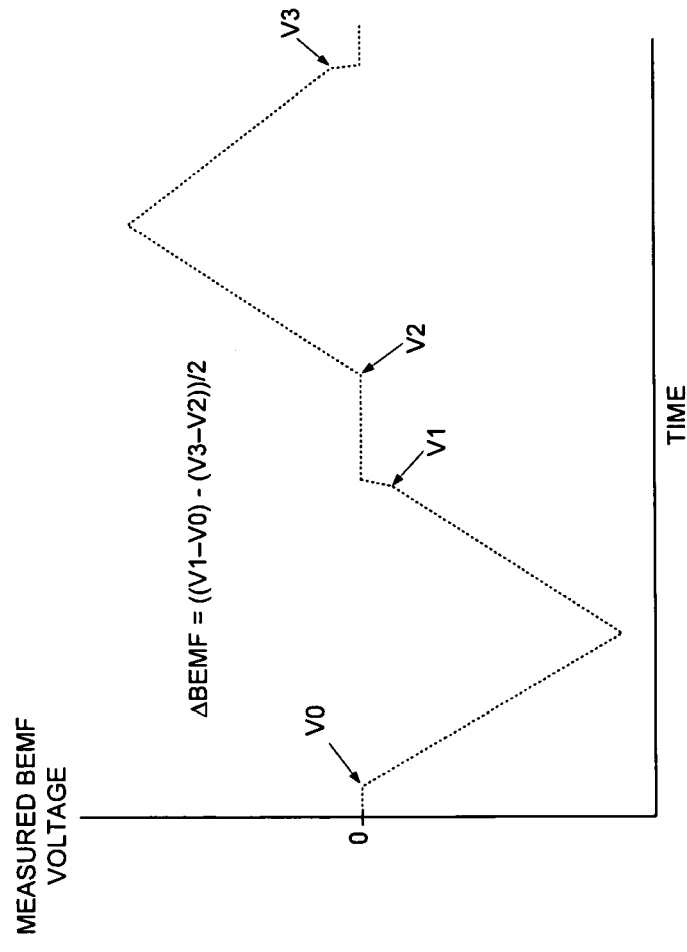

FIGS. 5A and 5B illustrate an embodiment of the present invention wherein the control circuitry 8 updates the IR voltage detector 18 by computing a first delta voltage while moving the actuator arm 26 in one direction (e.g., toward the ID), a second delta voltage while moving the actuator arm 26 in an opposite direction (e.g., toward the OD), and then computing an average of the difference between the first and second delta voltages which may help average out noise in the measured delta voltages. In one embodiment, the final delta voltage used to adjust the IR voltage detector 18 is computed according to:

$$\Delta BEMF = ((V1-V0)-(V3-V2))/2.$$

Figure 5C:
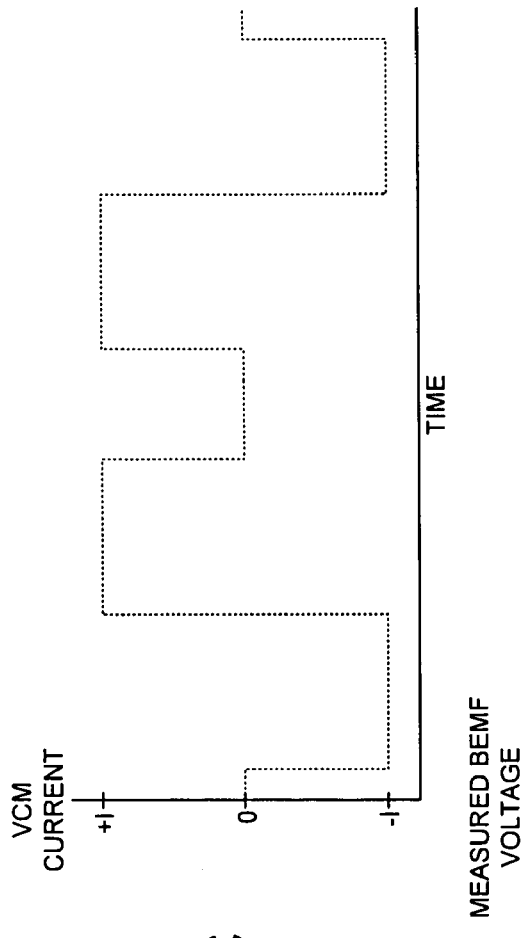
FIGS. 5C and 5D illustrate an embodiment of the present invention wherein moving the actuator arm in opposite directions may help cancel the effect of a flex bias force when generating the delta voltage used to update the IR voltage detector.
Figure 5D:
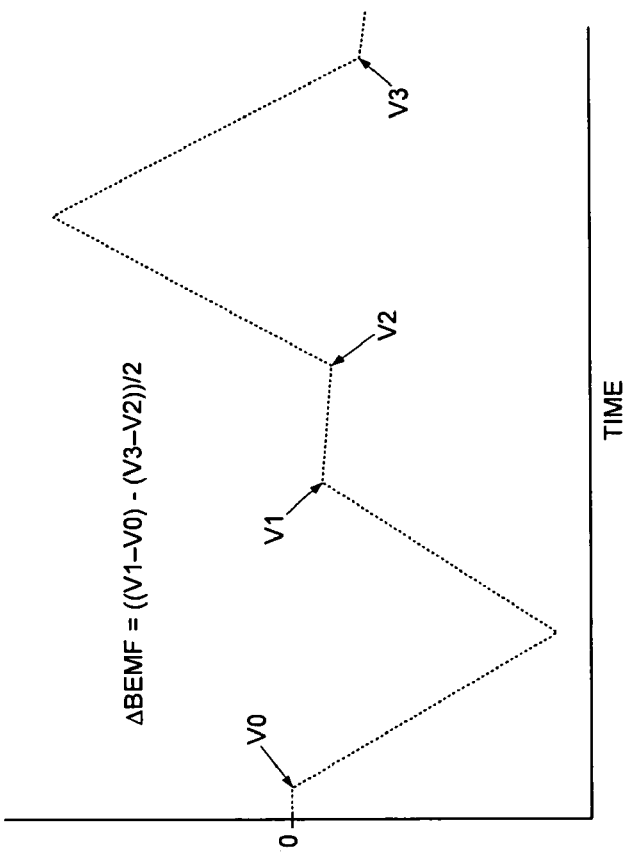

FIGS. 5C and 5D illustrate that in one embodiment moving the actuator arm 26 in opposite directions may additionally help cancel a bias force that the flex circuit has on the actuator arm 26. The flex circuit carries various signals, including the read/write signals from/to a preamp circuit mounted on the actuator arm 26 to a circuit board mounted on the base of the disk drive. If the IR voltage detector 18 is calibrated correctly, then pulsing the voice coil to move the actuator arm 26 in opposite directions as shown in FIG. 5C will result in the waveform shown in FIG. 5D. The final delta voltage computed using the above equation will be zero when the IR voltage detector 18 is calibrated correctly, which illustrates that the effect of the flex bias force on the final delta voltage measurement may be canceled when the IR voltage detector 18 is not calibrated correctly.

Figure 6:
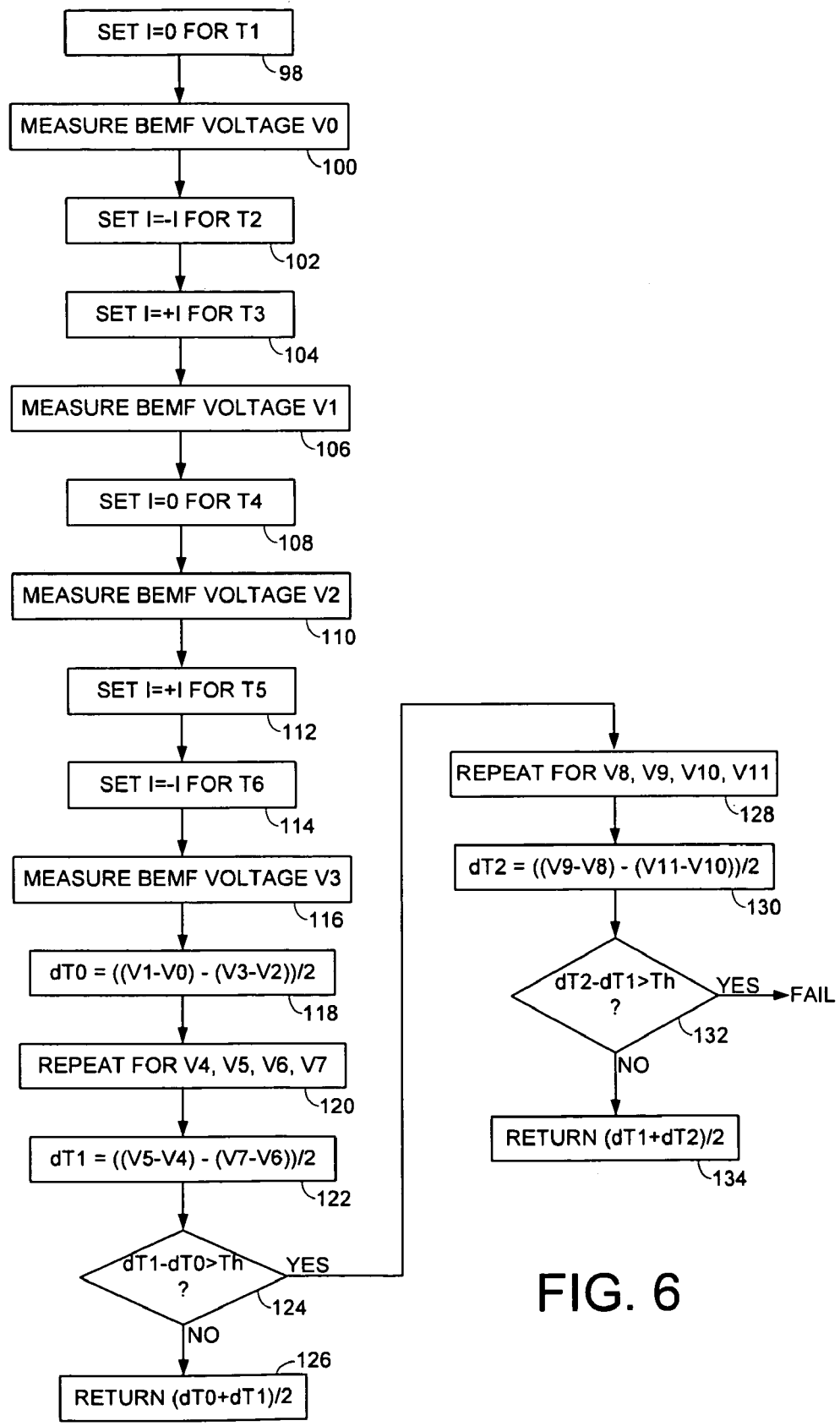
FIG. 6 shows a flow diagram according to an embodiment of the present invention wherein if a difference between the delta voltages exceeds a threshold, indicating the actuator arm may have been pressed against a crash stop, the process is repeated.

If the actuator arm 26 is against the crash stop 30 when updating the IR voltage detector 18, the back EMF voltage after attempting to move the actuator arm 26 will not accurately represent the change in the voice coil resistance. FIG. 6 is a flow diagram according to an embodiment that evaluates the measured back EMF voltages to detect whether the actuator arm 26 was pressed against the crash stop 30. The control current is set to zero for a first interval (step 98) and then a first back EMF voltage V0 is measured (step 100). The control current is then set to a negative value for a second interval (step 102) then to a positive value for a third interval (step 104), and thereafter a second back EMF voltage V1 is measured (step 106). The control current is then set to zero for a fourth time interval (step 108), and after the fourth time interval a third back EMF voltage V2 is measured (step 110). The control current is then set to a positive value for a fifth interval (step 112) then to a negative value for a sixth interval (step 114), and thereafter a fourth back EMF voltage V3 is measured (step 116). A first delta voltage dT0 is computed in response to the back EMF voltages V0, V1, V2 and V3 (step 118). The above steps will move the actuator arm 26 in one direction (e.g., toward the ID) and then in an opposite direction (e.g., toward the OD). If the actuator arm 26 is pressed against the crash stop 30, one of the measured back EMF voltages will not be valid, but the actuator arm 26 will have been moved away from the crash stop 30.

The above steps are then re-executed (step 120) in order to generate a second delta voltage dT1 (step 122). If the difference between the first delta voltage dT0 and the second delta voltage dT1 does not exceed a threshold (step 124), then the average of the first and second delta voltages is returned as the result (step 126). If the difference between the first delta voltage dT0 and the second delta voltage dT1 exceeds a threshold (step 124), it indicates the actuator arm 26 was pressed against the crash stop 30 when generating the first delta voltage dT0. However, the actuator arm 26 will also have been moved away from the crash stop 30 after generating the second delta voltage dT1. Therefore, the above steps are executed again (step 128) to generate a third delta voltage dT2 (step 130). If the difference between the second delta voltage dT1 and the third delta voltage dT2 exceeds a threshold (step 132), then the update operation fails. Otherwise, the average of the second and third delta voltages is returned as the result (step 134).

Figure 7:
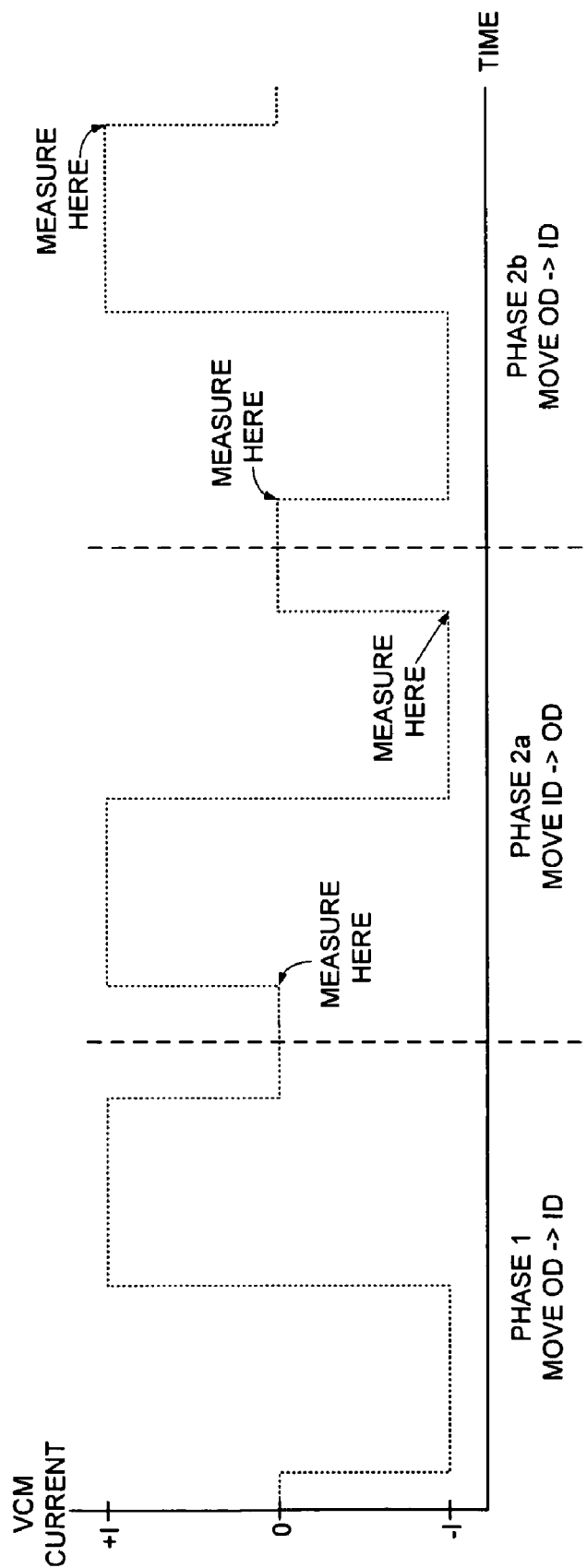
FIG. 7 illustrates an embodiment of the present invention wherein an initial current is applied to the voice coil to move the actuator arm toward an inner diameter of the disk, and then two delta voltages are measured and averaged to compensate for flex bias.

FIG. 7 shows an alternative embodiment of the present invention which ensures the crash stop 30 does not affect the measurement of the delta voltage and also compensates for the flex bias. The update procedure shown in FIG. 7 is executed over three phases, wherein during the first phase an initial control current (e.g., negative then positive pulse) is applied to the voice coil to move the actuator arm 26 toward the inner diameter of the disk. If the actuator arm 26 is pressed against the outer diameter crash stop 30, the initial control current will move the actuator arm 26 away from the crash stop 30. If the actuator arm 26 is pressed against the inner diameter crash stop 30, the initial control current will press the actuator arm 26 against the crash stop 30.

The next two phases of the update procedure operate similar to FIGS. 5A and 5B described above. The second phase (phase 2a) of the update procedure will move the actuator arm toward the outer diameter of the disk as shown in FIG. 7. If the initial control current of the first phase moved the actuator arm 26 away from the outer diameter crash stop 30, then the second phase (phase 2a) will move the actuator arm 26 toward the outer diameter crash stop 30 (but should not reach it). If the initial control current of the first phase pressed the actuator arm 26 against the inner diameter crash stop 30, then the second phase (phase 2a) will move the actuator arm 26 away from the inner diameter crash stop 30, and the third phase (phase 2b) will move the actuator arm 26 toward the inner diameter crash stop 30 (but should not reach it).

In one embodiment, prior to updating the IR voltage detector 18 the control circuitry 8 seeks the head 4 to an outer diameter of the disk 4 in response to the servo sectors $32_0$-$32_N$. The IR voltage detector 18 is then calibrated and the VCM control loop switched to a velocity control in order to unload the actuator arm 26. In this embodiment, applying an initial current to the voice coil (e.g., the first phase of FIG. 7) may not be necessary since the radial location of the head 4 is known prior to updating the IR voltage detector 18.

Figure 8B:
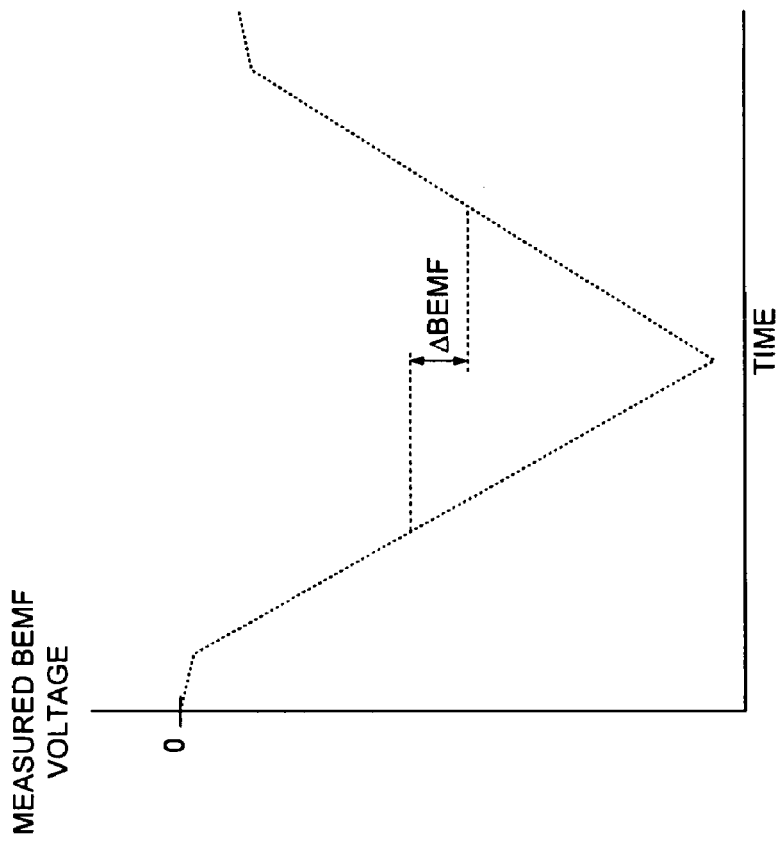
FIGS. 8A and 8B illustrate an embodiment of the present invention wherein the control currents are ramped in order to reduce acoustic noise.
Figure 8A:
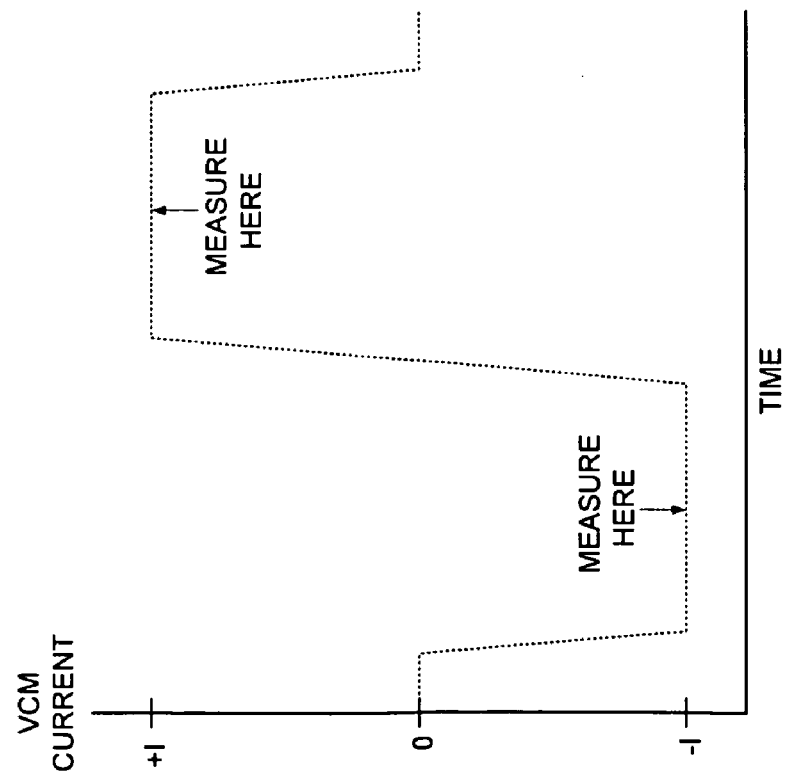

FIGS. 8A and 8B show an embodiment of the present invention wherein the control currents applied to the voice coil 6 when updating the IR voltage detector 18 are ramped in order to reduce acoustic noise. In one embodiment, the first back EMF voltage is measured after ramping the control current, and the second back EMF voltage is measured prior to ramping the control current as illustrated in FIG. 8A. In the embodiment of FIG. 8A, the control current is first ramped down to a negative value and then the first back EMF voltage is measured. After the first interval, the control current is ramped up to a positive value for a second interval and the second back EMF voltage is measured. The first back EMF voltage may be measured at any suitable time during the first interval, and the second back EMF voltage may be measured at a corresponding time during the second interval. In the embodiment shown in FIG. 8A, the first back EMF voltage is measured at the midpoint of the first interval, and the second back EMF voltage is measured at the midpoint of the second interval.

Any suitable control current may be employed in the embodiments of the present invention (other than the pulsed waveform of FIG. 4A), such as a triangular waveform or a pulse width modulated waveform. In addition, the polarity of the control current may be applied to the voice coil in any suitable order (positive then negative, or negative then positive).

In the embodiments described above, the actuator arm 26 is assumed to be stopped initially such that the initial back EMF voltage is zero. However, in other embodiments the initial velocity of the actuator arm 26 may be non-zero, and therefore the initial back EMF voltage may be non-zero.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head;
   a voice coil motor (VCM) comprising a voice coil operable to actuate the head radially over the disk;
   a VCM control loop comprising:
      a voltage detector operable to detect a voice coil voltage across the voice coil;
      a current detector operable to detect a current flowing through the voice coil;
      an IR voltage detector, responsive to the detected current, operable to detect a resistive voltage due to a resistance of the voice coil; and
      a back EMF detector for subtracting the resistive voltage from the voice coil voltage to generate a back EMF voltage; and
   control circuitry operable to update the IR voltage detector by:
      measuring a first back EMF voltage;
      after measuring the first back EMF voltage, applying a first control current to the voice coil for a first interval and applying a second control current to the voice coil for a second interval;
      after the second interval, measuring a second back EMF voltage;
      computing a first delta voltage relative to a difference between the first back EMF voltage and the second back EMF voltage; and
      adjusting the IR voltage detector in response to the first delta voltage and at least one of the first and second control currents.

2. The disk drive as recited in claim 1, wherein the first control current comprises a polarity opposite a polarity of the second control current.

3. The disk drive as recited in claim 2, wherein the first control current comprises an amplitude substantially equal to an amplitude of the second control current.

4. The disk drive as recited in claim 1, wherein the first interval substantially equals the second interval.

5. The disk drive as recited in claim 1, wherein the control circuitry is further operable to adjust the IR voltage detector in response to the delta voltage divided by at least one of the first and second control currents.

6. The disk drive as recited in claim 1, wherein prior to measuring the first back EMF voltage, the control circuitry is further operable to apply an initial current to the voice coil.

7. The disk drive as recited in claim 1, wherein the control circuitry is further operable to update the IR voltage detector by:
   after the second interval, measuring a third back EMF voltage;
   after measuring the third back EMF voltage, applying a third control current to the voice coil for a third interval and applying a fourth control current to the voice coil for a fourth interval;
   after the fourth interval, measuring a fourth back EMF voltage;
   computing a second delta voltage relative to a difference between the third back EMF voltage and the fourth back EMF voltage; and
   adjusting the IR voltage detector in response to the first and second delta voltages and at least one of the first, second, third and fourth control currents.

8. The disk drive as recited in claim 7, wherein the first and second control currents move the VCM in a first direction and the third and fourth control currents move the VCM in a second direction opposite the first direction.

9. The disk drive as recited in claim 7, wherein the control circuitry is operable to compute an average voltage in response to the first and second delta voltages.

10. The disk drive as recited in claim 7, wherein if a difference between the first and second delta voltages is greater than a threshold, the control circuitry is further operable to regenerate the first and second delta voltages.

11. The disk drive as recited in claim 1, wherein prior to applying the first control current to the voice coil, the control circuitry is further operable to seek the head to an outer diameter of the disk.

12. The disk drive as recited in claim 1, wherein the control circuitry is further operable to update the IR voltage detector by:
   prior to the first interval, ramping the control current to the first control current; and
   after the first interval, ramping the control current to the second control current.

13. A method of operating a disk drive, the disk drive comprising a disk, a head, a voice coil motor (VCM) comprising a voice coil operable to actuate the head radially over the disk, and a VCM control loop comprising:
- a voltage detector operable to detect a voice coil voltage across the voice coil;
- a current detector operable to detect a current flowing through the voice coil;
- an IR voltage detector, responsive to the detected current, operable to detect a resistive voltage due to a resistance of the voice coil; and
- a back EMF detector for subtracting the resistive voltage from the voice coil voltage to generate a back EMF voltage; and the method comprising:
- measuring a first back EMF voltage;
- after measuring the first back EMF voltage, applying a first control current to the voice coil for a first interval and applying a second control current to the voice coil for a second interval;
- after the second interval, measuring a second back EMF voltage;
- computing a first delta voltage relative to a difference between the first back EMF voltage and the second back EMF voltage; and
- adjusting the IR voltage detector in response to the first delta voltage and at least one of the first and second control currents.

14. The method as recited in claim 13, wherein the first control current comprises a polarity opposite a polarity of the second control current.

15. The method as recited in claim 14, wherein the first control current comprises an amplitude substantially equal to an amplitude of the second control current.

16. The method as recited in claim 13, wherein the first interval substantially equals the second interval.

17. The method as recited in claim 13, further comprising adjusting the IR voltage detector in response to the delta voltage divided by at least one of the first and second control currents.

18. The method as recited in claim 13, further comprising applying an initial current to the voice coil prior to measuring the first back EMF voltage.

19. The method as recited in claim 13, further comprising:
- after the second interval, measuring a third back EMF voltage;
- after measuring the third back EMF voltage, applying a third control current to the voice coil for a third interval and applying a fourth control current to the voice coil for a fourth interval;
- after the fourth interval, measuring a fourth back EMF voltage;
- computing a second delta voltage relative to a difference between the third back EMF voltage and the fourth back EMF voltage; and
- adjusting the IR voltage detector in response to the first and second delta voltages and at least one of the first, second, third and fourth control currents.

20. The method as recited in claim 19, wherein the first and second control currents move the VCM in a first direction and the third and fourth control currents move the VCM in a second direction opposite the first direction.

21. The method as recited in claim 19, further comprising computing an average voltage in response to the first and second delta voltages.

22. The method as recited in claim 19, wherein if a difference between the first and second delta voltages is greater than a threshold, further comprising regenerating the first and second delta voltages.

23. The method as recited in claim 13, wherein prior to applying the first control current to the voice coil, further comprising seeking the head to an outer diameter of the disk.

24. The method as recited in claim 13, further comprising:
- prior to the first interval, ramping the control current to the first control current; and
- after the first interval, ramping the control current to the second control current.

* * * * *